March 22, 1966  C. J. KOESTER ETAL  3,242,440
TIME-CONTROLLED-OUTPUT LASER STRUCTURE
Filed Oct. 3, 1962  3 Sheets-Sheet 1

Inventors
Charles J. Koester
Herbert M. Teager
Elias Snitzer
Richard F. Woodcock
By John A. Harvey
Attorney March 22, 1966 C. J. KOESTER ETAL 3,242,440
TIME-CONTROLLED-OUTPUT LASER STRUCTURE
Filed Oct. 3, 1962 3 Sheets-Sheet 2

Inventors
Charles J. Koester
Herbert M. Teager
Elias Snitzer
Richard F. Woodcock
By John A. Harvey
Attorney March 22, 1966     C. J. KOESTER ETAL     3,242,440
TIME-CONTROLLED-OUTPUT LASER STRUCTURE
Filed Oct. 3, 1962     3 Sheets-Sheet 3
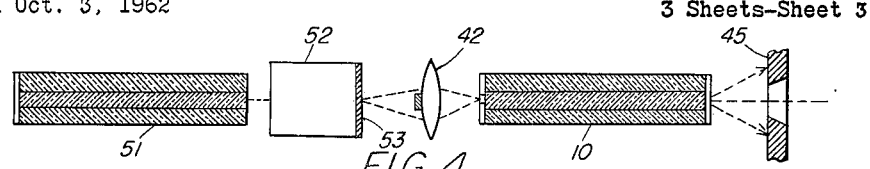
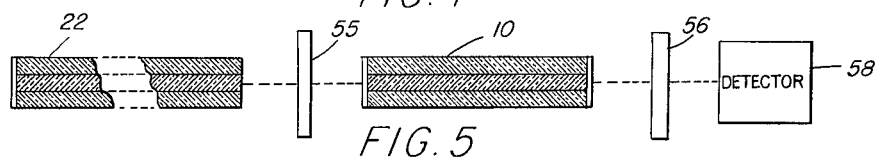
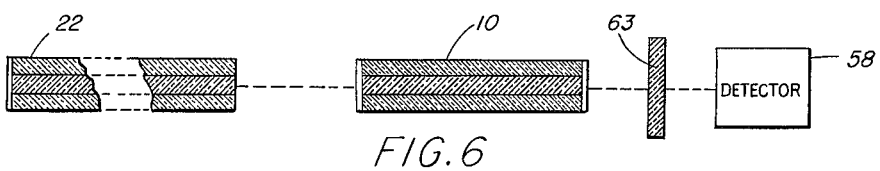
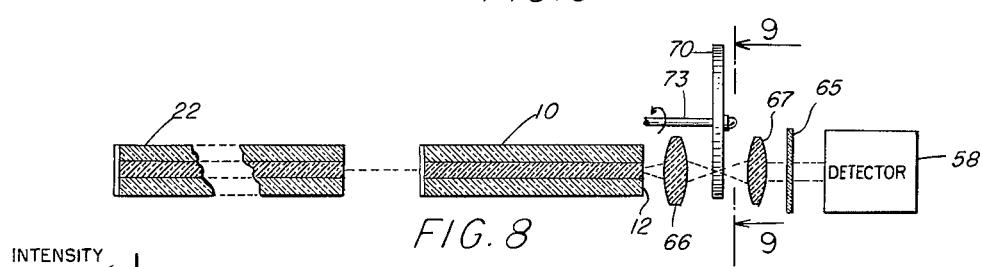
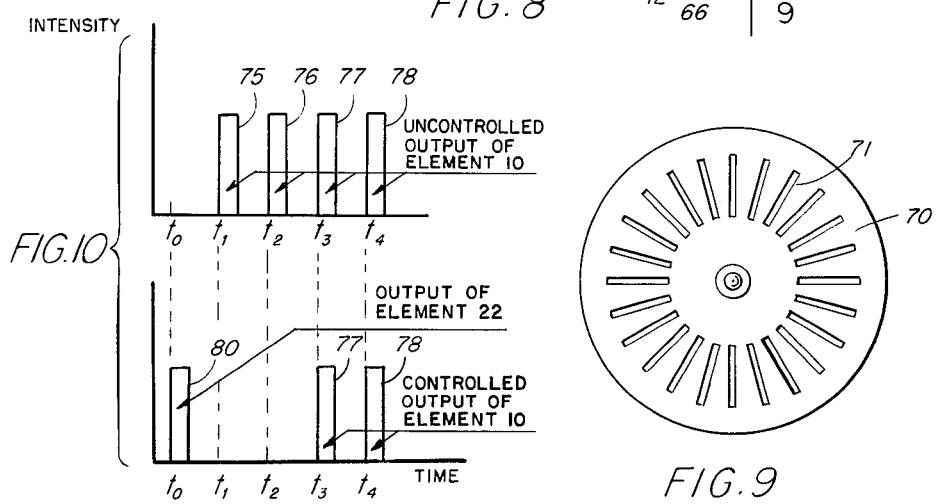
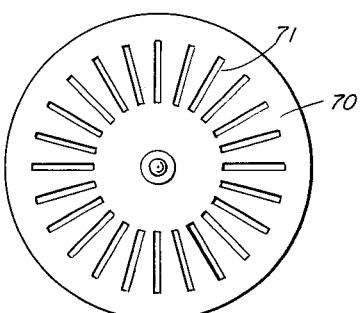
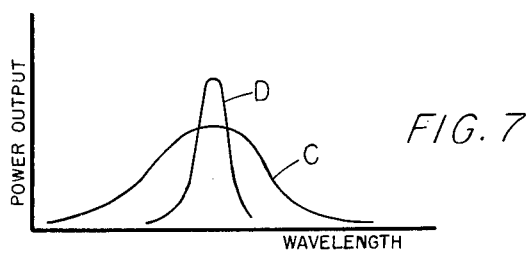
Inventors
Charles J. Koester
Herbert M. Teager
Elias Snitzer
Richard F. Woodcock
By John A. Haroldy
Attorney 3,242,440
TIME-CONTROLLED-OUTPUT LASER
STRUCTURE
Charles J. Koester, South Woodstock, Conn., Herbert M.
Teager, Belmont, and Elias Snitzer, Sturbridge, Mass.,
and Richard F. Woodcock, South Woodstock, Conn.,
assignors to American Optical Company, Southbridge,
Mass., a voluntary association of Massachusetts
Filed Oct. 3, 1962, Ser. No. 228,071
20 Claims. (Cl. 331—94.5)

This invention relates to lasers, and more particularly to laser structures including a plurality of laser components and wherein an emissive energy output from one laser component is switched on or off by emissive energy from another laser component.

Lasers, otherwise referred to as optical masers, are light-amplifying or light-producing devices and are specifically adapted to provide an output of high-intensity, coherent, monochromatic light. Light is produced in a laser by photonic emission from the active atoms of a body composed of a so-called laser material, occurring incident to the transition of the atoms from an excited upper energy level to a terminal lower energy level. Accordingly, laser operation broadly involves exciting active atoms in the laser body to such upper energy level, and inducing a coherent emissive transition of the excited atoms to the terminal level to develop a monochromatic high-intensity laser output light pulse.

By way of example, one form of laser structure includes a rod-shaped body of solid laser material disposed coaxially within, or itself defining, a so-called resonant cavity having opposed internally reflective cavity ends. An energy source for exciting atoms to the aforementioned upper energy level is provided by a gaseous discharge flash tube, adapted to emit a pulse of so-called "pumping" light specifically including light having wavelengths falling within at least one absorption band of the laser material, and arranged so that this pumping pulse is incident on light-transmissive surfaces of the laser body. Upon actuation of the flash tube, the resultant light pulse enters the laser body and photons of energy of appropriate absorptive wavelength are absorbed by active atoms in the body, causing these atoms to shift from an initial low energy level through a series of interlevel transitions to the upper energy level referred to above and from which emissive transition occurs. Lasering action may take place when the population of atoms thus established at this upper energy level exceeds the population of atoms at the aforementioned terminal level (a condition referred to as an inversion of energy states of the body) and specifically when the degree of inversion attained in the body is equal to or above a so-called threshold value dependent on the properties of the particular laser material used and on energy loss factors in the structure.

When this inversion of energy states has been accomplished, individual atoms of the upper level population spontaneously shift to the terminal level with concomitant emission of light of a characteristic laser emissive wavelength determined by the nature of the laser material employed. A portion of the spontaneously emitted light is reflected back and forth through the resonant cavity structure between the internally reflective cavity ends. Since emissive transition of upper level atoms can be induced by light of the laser emissive wavelength, the passage of this spontaneously emitted light through the laser body in multiple bidirectional reflections induces other atoms of the enlarged upper level population to undergo light-emissive transition to the terminal level. The light thereby produced, having the same laser emissive wavelength, augments the bidirectionally reflected light in the cavity to induce still further light-emissive transitions from the upper level population. Thus a rising pulse of bidirectionally reflected light quickly develops in the cavity, reaching a quantitatively large value as the induced emissive transition of atoms from the upper level population becomes massive. If one of the reflective cavity ends is partially transmissive in character, a portion of this large bidirectionally reflected light pulse will pass through the partially transmissive cavity end and out of the cavity to constitute a coherent, highly monochromatic laser output light pulse of the laser emissive wavelength.

As will be understood, individual atoms in the laser body may emit light in any of a large plurality of possible modes, including the modes for the plane waves propagated parallel to the long axis of the body, herein designated the axial plane wave modes, and modes for waves directed at angles to the axis, herein referred to as off-axis modes. By using any of several well-known constructions emphasizing an elongate configuration of the laser cavity and its termination by parallel opposed internally reflective surfaces, the emitted light which passes back and forth through the cavity in multiple bidirectional reflections during lasering action can be made to be predominantly that portion of the emitted light which is in the axial plane wave modes. Light in off-axis modes is then to a considerable extent dissipated after at most a few passes through the cavity, in accordance with well-known principles of geometrical optics. When the stimulated emission of light in the laser body occurs predominantly in the axial plane wave modes, the laser output light pulse is concentrated in a narrow beam coaxial with the body.

In laser operation of the character described above, a finite interval ordinarily elapses between attainment of the requisite degree of inversion in the laser body and initiation of lasering action, due primarily (as is presently believed) to the time required for the necessary development of energy density in the laser cavity. At the end of this interval, the laser emissive energy output begins, as one or a succession of output light pulses rising in instantaneous power from a low initial value and continuing until the light-producing transitions of upper level atoms so far depopulate the upper level that the degree of inversion in the laser body drops below the threshold value. Lasering action in the sense of significant light production ceases as soon as the degree of inversion falls below threshold.

In certain laser applications, it would be desirable to accelerate the initiation of the emissive energy output by switching on the output in a controlled manner within the initial finite interval last discussed, thus to sharpen the leading edge of the output pulse or to cause the output pulses to provide evidence of the presence or absence of the control effect. Again, in certain instances it would be desirable to control the duration of the output pulse by switching off the pulse at a predetermined moment, prior to the time at which it would ordinarily be ended. Furthermore, and for example to provide optical logic circuits as hereinafter more fully explained, it may be desirable in some cases selectively to prevent any initiation of the laser output pulse after pumping of the laser body.

The present invention is concerned with the provision of such switching control of the laser light output from a laser body. Specifically, applicants have discovered that when the first laser body is at or above the threshold degree of inversion, as after pumping and either prior to or during lasering action, emissive transitions of upper level atoms in the body can be induced by passing through the body a control beam of light energy which has substantially the same wavelength as that emitted by the body but which itself may or may not contribute to the laser light output depending upon the end result desired. Applicants have further discovered that this inducing of emissive transitions with a beam from an external source can be used to effect very abrupt switching control of the laser light output if the control beam is sufficiently intense or if, being of lower intensity, it is amplified to high intensity by lasering action of the laser body.

In the structures of the present invention, the external source of the switching control beam may be comprised by any source of light energy having an energy component of the requisite control wavelength and of the requisite control intensity. Each such control energy component of the light source is selected by an appropriate filter if the light source has other energy components not needed or desired for control of the laser body. The control light source conveniently is a second laser body which is composed of the same laser material as the first laser body (the body to be controlled) and which therefore has the requisite identity of output light wavelength with the first body. To switch off the light output from the first laser body, the second laser body is arranged to emit an output light control pulse directed into the first laser body and initiated at the desired switching time during the continuation of light output from the latter. The emissive transitions induced in the first laser body by this control pulse from the second body effect amplification of the light intensity of the control pulse and thereby rapidly and substantially reduce in the first body the number of atoms available to produce laser output light energy. As earlier mentioned, by proper arrangement the amplified control light pulse can be made not to contribute to the laser output light energy. The depopulation of the upper level atoms in this manner because the degree of inversion in the first body rapidly to fall below the threshold value and thereby terminate lasering action in the first body. Thus there is the desired result that the normal on-axis laser output light from the first body is abruptly switched off.

The same character of operation may be used to provide selective prevention at any normal on-axis output from the first body, for the optical logic elements referred to above. For example, and considering one particular construction for illustration, during the finite interval between establishment of inversion and initiation of lasering action in the first body, the control beam may be directed into the first body in such manner that it passes through the first body at an angle to the axis of the latter. This beam induces emission of light in the first body in those off-axis modes which amplify the passing control beam, and emerges from the first body as an amplified off-axis beam. By effecting such induced emission, it causes the degree of inversion in the first body to fall below threshold before normal lasering action can develop therein, and thus prevents the initiation of any on-axis output from the first body.

When the output from the second laser body is to be used to switch on the output from the first body, the structure is arranged so that the second laser body fires first to emit an output control light pulse initiated at a time subsequent to the establishment of the requisite inversion in the first body but before lasering action begins therein. This control light pulse is directed into the first body parallel to the axis of the latter. In such case, the emissive transitions induced in the first laser body by the beam from the second laser body produce predominantly axial plane wave light in the first body and accelerate the initiation of lasering action in the latter. Thus the output light pulse from the first body is initiated or switched on prior to the time at which it would otherwise begin and the build up of the light pulse intensity is accelerated to an extent depending on the relative timing of the control light pulse.

Further features and advantages of the invention will be apparent from the detailed description hereinbelow set forth, together with the accompanying drawings, wherein:

FIG. 4 is a simplified diagrammatic view of a modified form of the structure of FIGS. 1 and 2 showing an alternatve synchronization arrangement;

FIG. 5 is a simplified diagrammatic view of a further modified form of the structure of FIGS. 1 and 2 showing an alternative arrangement for beam separation;

FIG. 6 is a simplified diagrammatic view of another modification of the structure of FIGS. 1 and 2, having a further alternative arrangement for beam separation;

FIG. 7 is a graph illustrating the relation of wavelength band width between the light outputs of the laser components of the structure of FIG. 5;

FIG. 8 is a simplified diagrammatic view of a further alternative form of the structure of FIGS. 1 and 2;

FIG. 9 is an elevational face view of the shutter 70 used in the FIG. 8 structure;

FIG. 10 is a graph illustrating the comparative outputs of the structure of FIG. 6 with and without switching action;

FIG. 11 is a simplified diagrammatic view of an alternative embodiment of the invention, showing an arrangement of laser components providing an optical logic element; and FIG. 12 is a schematic view of a further embodiment of the invention.

Figure 1:
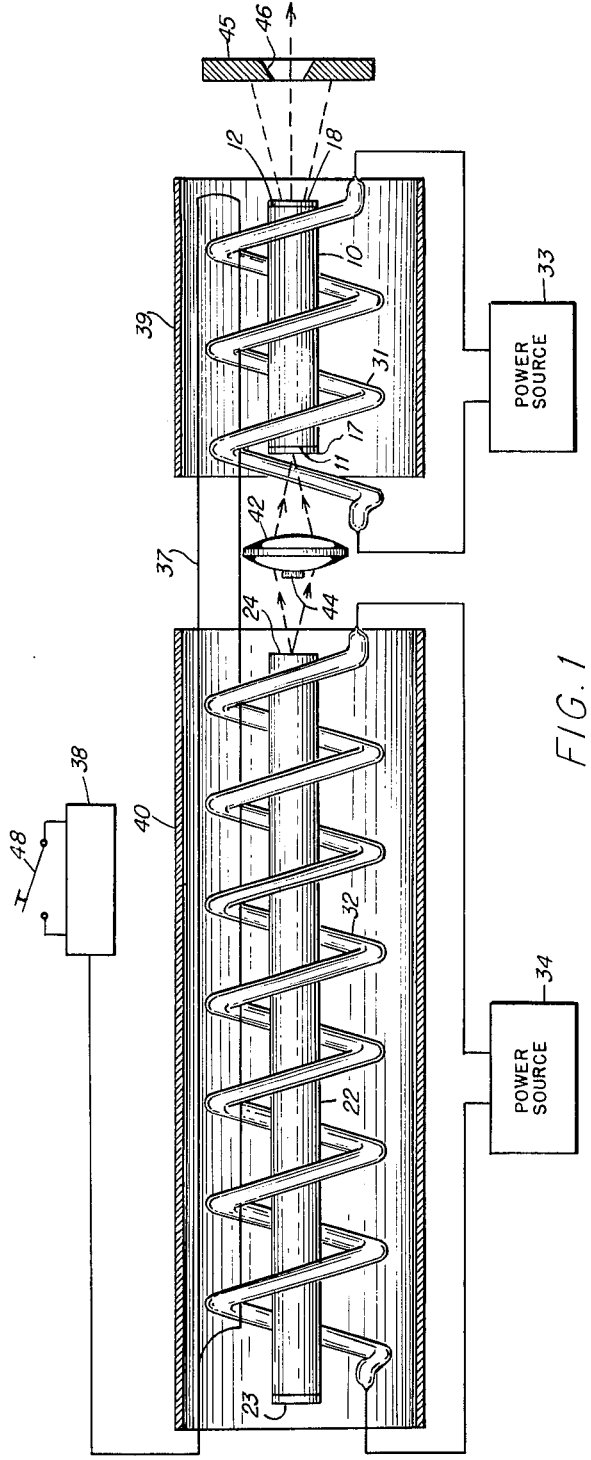
FIG. 1 is a schematic view of a laser structure embodying the present invention in a particular form.
Figure 2:
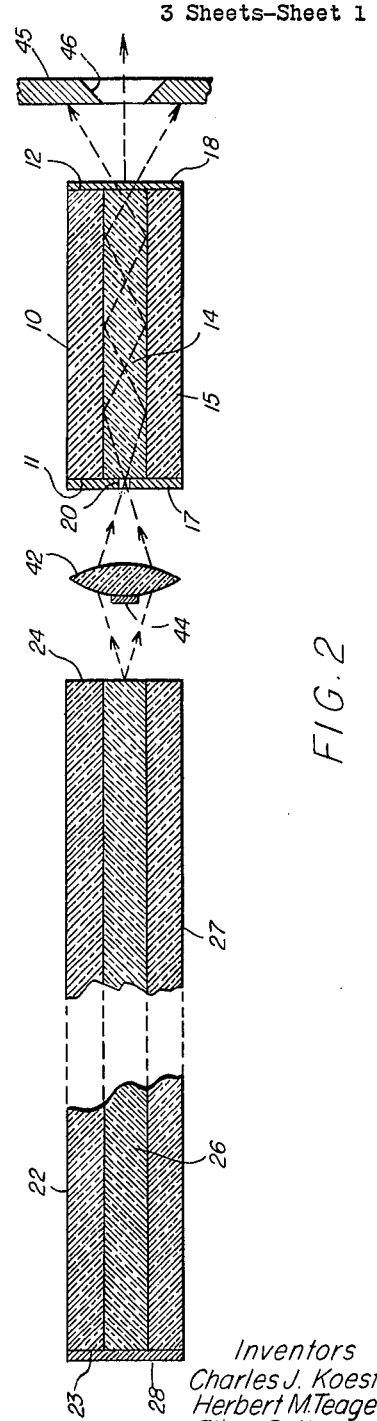
FIG. 2 is an enlarged diagrammatic section view of certain elements of the structure of FIG. 1.

Referring first to FIG. 1, and for certain specific details to FIG. 2, the embodiment of the invention there illustrated comprises a laser structure wherein an output light pulse from a first laser body is switched off by the output light pulse from a second laser body. In this structure, the first laser body is provided by a cylindrical rod-shaped laser element 10 having opposed, plane, parallel end faces 11, 12, and including an axially central core portion 14 forming an active laser component, fabricated for example of neodymium-doped glass and surrounded concentrically over its entire length by a conventional glass cladding 15 having a refractive index lower than that of the core material. By way of illustration, this element may have a length of 2.5 inches, with an external diameter of 0.20 inch and a core diameter of 0.12 inch.

The end faces 11 and 12 have vacuum-evaporation deposited coatings of silver, respectively designated 17, 18, to constitute internally reflective termini of a conventional resonant laser cavity. The coating 18 on the end face 12 is made partially transmissive and it is from this end face that the laser output light pulse emerges, as indicated by the arrows in FIGS. 1 and 2. The coating 17 on the end face 11 is essentially fully reflective. A central portion of the end face 11 is uncoated, however, to provide a circular light-transmissive opening 20 in the coating 17, coinciding with the axis of the element 10 and conveniently having a diameter (for an element of dimensions as set forth above) of 1 mm.

The second laser body in the structure of FIG. 1 is provided by another cylindrical rod-shaped laser element 22, disposed in spaced coaxial relation to the element 10 and similar in construction to the latter element. Thus, the element 22 has opposed, plane, parallel end faces 23, 24, an axially central core portion 26 forming an active laser component and fabricated of a laser material (such as neodymium-doped glass) identical in composition with that of the core 14, and a glass cladding 27 concentrically surrounding the core 26 over its entire length. However, the element 22 is substantially larger than the element 10, especially in axial length. Thus, if the element 10 has the dimensions indicated above, the element 22 may for example be 18 inches long with an external diameter of 0.375 inch and a core diameter of 0.25 inch.

The end face 23 of the element 22 has an essentially fully reflective vacuum-evaporation deposited silver coating 28 to provide a first reflective resonant cavity terminus. The other end face 24 is uncoated and therefore light-transmissive, but reflects at least a small amount of wave energy (of the order of 5%) because it is engaged externally by air which has a lower index of refraction than the core 26. In a laser component of substantial length, such as the element 22, such partial end reflectivity is sufficient to provide one end termination of a resonant cavity structure. Hence the end face 24 provides the second resonant cavity terminus for the element 22, and the laser output light pulse from the core 26 emerges through this latter end face.

Sources of pumping light energy are provided for each of the laser elements 10, 22, such sources being shown as helical gaseous discharge flash tubes 31, 32 respectively disposed to surround the laser elements concentrically for substantially the entire length of the elements but in spaced relation to the side walls thereof. These flash tubes are adapted to emit pulses of light including light in the wavelength of an absorption band of the laser material. They are powered from appropriate power sources respectively designated 33, 34, of conventional design and including high-voltage sources of electric current and capacitors for energy storage, which are connected through suitable leads to electrodes provided in opposite ends of the tubes.

The pulse-producing discharges in the flash tubes are initiated by means of a single trigger circuit 37, shown as encircling the turns of both helical flash tubes in proximity thereto and powered from a suitable control instrumentality indicated at 38. The character and arrangement of these elements is such that with sufficient charge energy stored in the power sources 33, 34, a high voltage electrical pulse sent to the trigger circuit 37 by the control instrumentality 38 will cause simultaneous pulse-producing discharges in the flash tubes, and thus produce simultaneous inputs of pumping energy to the laser elements 10, 22.

In general, the time elapsing between the start of pumping and the initiation of lasering action for a given volume of laser material is inversely related to the magnitude of the pumping input power.

The operational characteristics of the flash tubes 31, 32 and the voltage of and quantity of energy stored by their associated power sources 33, 34 are accordingly selected in relation to the laser-material volumes of the respective laser elements 10, 22 that, upon simultaneous actuation of the two flash tubes by the common trigger circuit 37, lasering action will begin first in the core 14 of the element 10 and at a predetermined time thereafter in the core 26 of the element 22. This synchronization between the output light pulses from the two laser elements is conveniently achieved by adjustment and control over the regulation and value of energy storage of the electrical energy inputs from the two power sources to their associated flash tubes. The selection of appropriate power input values to provide the desired synchronization will be apparent to those skilled in the art.

The elements 10, 22 and associated flash tubes are concentrically surrounded by respective open-ended hollow cylindrical reflectors 39, 40 having internally reflective surfaces to concentrate the pumping light emitted by the flash tubes into the laser cores 14 and 26. The refractive effect of the glass claddings 15, 27 further serves to concentrate the pumping light into the active cores of the laser elements. The silvered end surfaces of the elements 10 and 22 preferably are protected from being impacted by light emitted from the flash tubes, as by the use of protective sleeves or caps (not shown) of suitable design fitted over the extremities of the lasser elements adjacent these ends.

Intermediate the element 10 and the element 22, and disposed coaxially therewith, is a positive lens 42 adapted to focus light emitted from the end face 24 of the element 22 through a focal point coinciding with the opening 20 in the silvered end coating 17 of the element 10. The central portion of this lens is covered by a circular light-absorptive or light-reflective mask 44 to occlude the central portion of the light beam emitted from the element 22 so that the light focused by the lens 42 converges to the opening 20 as a hollow cone. The structure of FIGS. 1 and 2 further includes a mask 45 positioned in spaced relation to the end face 12 of the laser element 10 and defining a circular aperture 46 coaxial with the latter element. This apertured mask is adapted to permit free passage of light emitted by the core 14 through the end face 12 in a beam substantially parallel to the axis of the element 10, but to block and absorb any light emitted by the core 14 at a substantial angle to such axis.

In the light of the foregoing description, the operation of the illustrated structure will be readily understood. With sufficient charge energy stored in the power sources 33, 34 for the desired gaseous discharges in the flash tubes, the control instrumentality 38 is actuated (as by closing a manually operated switch 48) to pass an electrical pulse through the trigger circuit 37 to initiate such discharges. Thereby simultaneous pulses of light are produced by the two flash tubes and pass into the respective cores 14, 26 through the glass claddings 15, 27. Photons of this pumping light energy are absorbed by active atoms in the cores to cause them to shift from an initial low energy level to a very unstable high energy level in an energy-absorptive transition; from this unstable level the atoms shift immediately again, in spontaneous transition, to the relatively stable upper energy level from which emissive transition occurs. In this manner the pumping light pulses from the flash tubes produce, in the respective cores, upper level populations sufficiently large to establish in each core an inversion of energy states well above the threshold value.

As previously explained, the operational parameters are selected such that lasering action begins in the core 14 of the shorter laser element 10. Light emitted by spontaneous transition of atoms of the enlarged upper level population in this core is reflected back and forth in multiple passes between the silvered surfaces 17, 18 and induces light-emissive transition of other upper level atoms so that a large bidirectionally reflected light pulse quickly develops in the core. Due to the configuration and arrangement of the core and the end surfaces 17, 18, this light is predominantly in the axial plane wave modes. A portion of the developing light pulse passes through the partially transmissive surface 18 to constitute a laser output light pulse, initially rising in intensity, and concentrated in a narrow beam coaxial with the element 10 because of the mode-selective effect of the cavity structure. This output light pulse passes freely through the mask aperture 46 for use or detection beyond the mask 45 as desired.

In like manner, lasering action also begins in the core 26 of the longer laser element 22 with development of a rising pulse of light reflected bidirectionally in multiple passes between the silvered surface 28 and the end face 24, to produce an output light pulse emitted through the latter end face. However, and by reason of the relative operational parameters selected for the core 26 including the selective relative magnitudes of the respective pumping energy inputs to the two cores, the output pulse of the core 26 begins at a later time than the output pulse emitted by the core 14. Specifically, the relative pumping energy inputs for the two laser elements are conveniently selected or adjusted such that the output pulse from the core 26 is initiated at a predetermined finite time after initiation of the output pulse from the core 14 but while the latter output pulse is continuing.

The output pulse from the core 26 is emitted through the end face 24 as a beam of light coaxial with the element 22. The lens mask 44 occludes the central portion of this beam, while the periphery of the beam is focused by the lens as a hollow cone of light converging to a focal point coincident with the opening 20 in the silvered surface 17 of the element 10 and thence passing into the core 14. In the core 14, this portion of the beam is reflected back and forth between the clad walls of the core and along successively diverging and converging hollow paths directed toward the end face 12 but always at an angle to the axis of the element 10. The cladding 15 serves to contain this beam within the core 14, inhibiting losses through the core walls (because of the difference in refractive index between the core and cladding) as the beam thus passes through the core to the end face 12.

Thus an emission of laser energy from the core 26 is sent through the core 14, in the manner just described, at a time beginning while lasering action in the core 14 is continuing and hence while the inversion of energy states of the latter core is still at or above threshold. Since the cores 14 and 26 are of identical laser material, this emission from the core 26 is of the same wavelength as light emitted by the core 14. Consequently, the beam of light from the core 26 passing through the core 14 induces light-emissive transition of atoms in the latter core. The light thereby produced is predominantly in off-axis modes, amplifying the passing beam from the core 26, because all the emission-inducing light from the core 26 passing through the core 14 is at a substantial angle to the axis of the element 10 due to the effect of the lens 42 and the lens mask 44 (which occludes all light emitted by the core 26 that could enter the core 14 in an axial direction). The cone of light comprising the peripheral area portion of the output pulse from the core 26, and the light produced in the core 14 by emission induced by the latter pulse, emerges through the partially transmissive surface 18 of the element 10 as a hollow, amplified conical beam of which all light rays are necessarily at a substantial angle to the axis of the element 10. Because it emerges at such angle, this beam is divergent from the axial output pulse emitted by the core 14 and is not directed through the aperture 46, being occluded instead by the surface of the mask 45.

Ordinarily, the laser output light pulse resulting from lasering action in the core 14 and directed through the mask aperture 46 would continue until the depopulation of the upper level in the latter core incident to the lasering action reduced the degree of inversion in the core below threshold. However, the induced emissive transition of upper level atoms in the core 14 effective by passing the intense output light energy from the core 26 through the core 14 greatly accelerates the depopulation of the upper level in the latter core. Accordingly the degree of inversion of the core 14 is very rapidly and prematurely reduced below threshold, switching off the axial output pulse from the core 14 at a time substantially prior to that at which it would otherwise terminate.

Figure 3:
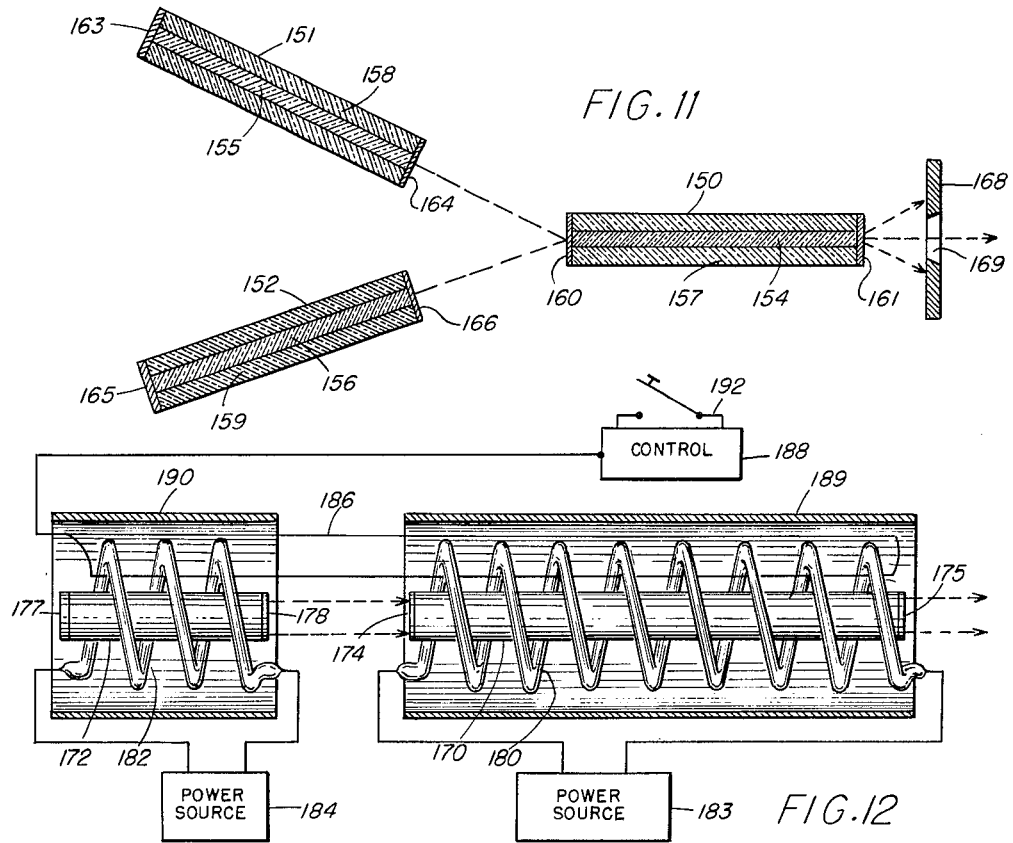
FIG. 3 is a graph illustrating the time relation between the output light pulses of the laser components of the structure of FIG. 1.
Figure 3:
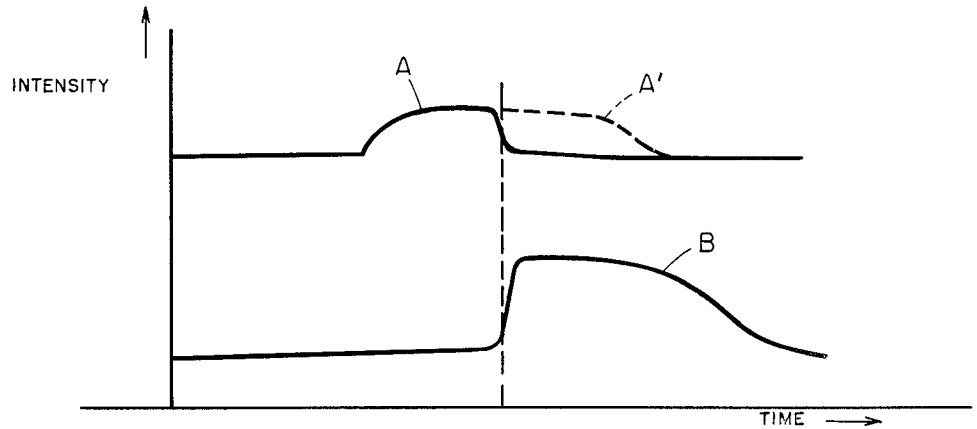

This switching effect is illustrated graphically in FIG. 3, wherein the solid curve A represents the light output of the core 14 passing through the mask aperture 36, and the curve B represents the output of core 26, with output intensity plotted against time. The broken curve A' represents the manner in which the output from the core 14 would continue if it were not prematurely switched off by the output from the core 26. As will be noted, the output from the core 14 terminates abruptly as soon as the output pulse from the core 26 is initiated. It will also be noted that the output pulse from the core 26 continues for some time thereafter. However, since the latter pulse after passing through the core 14 is absorbed by the mask 45, such prolonged pulse duration does not interfere with the desired abrupt termination of light output through the aperture 46.

Accordingly, it will be evident that the structure of FIGS. 1 and 2 is one which produces a laser light output pulse from the core 14 directed through the mask aperture 46, and that each such pulse is abruptly switched off by the subsequently initiated output pulse from the core 26 and therefore is controlled in duration by the time relation between the firing or output pulse initiation of the two cores. This control as previously explained is a function of the relative physical dimensions of the two laser cores and the pumping energy provided for each.

It will further be evident that the rapidity of switching, or in other words the time elapsing between initiation of the pulse from the core 26 and termination of the pulse from the core 14, is dependent on the intensity of the beam from the core 26 passed through the core 14. If such beam is sufficiently intense, it will switch off the output from the core 14 within as little as 1 microsecond after light emission from the core 26 begins, thus providing very rapid and accurate control of the termination (and hence the duration) of the axial output pulse from the core 14.

Since, in the structure described above, synchronization between the output pulse to be switched off (the output from element 10) and the switching or control laser light pulse (that from element 22) results in part from proportional differences in pumping energies supplied to the two elements, both being pumped simultaneously, it is apparent that this time relation between these output pulses may be varied by varying the electrical energy supplied to one flash tube relative to that supplied to the other. It will be appreciated, however, that other synchronization arrangements may be used. For example, both laser elements may be of the same length, with identical flash tubes and power inputs so that the interval between the initiation of pumping and initiation of the output pulse is the same for both, and the desired synchronization may then be achieved by actuating the respective flash tubes at times differing a preselected number of micro-seconds.

Synchronization may also be accomplished by appropriate selection of the relative magnitudes of the Q values, or ratios of wave energy storage to wave energy dissipation per wave energy cycle, of the respective resonant cavity structures provided by the two laser elements. Thus, if two laser elements identical in dimension but differing from each other in magnitude of Q are energized simultaneously with identical values of pumping light input, lasering action will begin first in the element having the higher cavity Q, and the interval elapsing before initiation of lasering action in the other element will be dependent on the magnitude of the difference between the cavity Q values. Such difference in Q may be provided, for example, by making the end surfaces of one element less reflective than those of the other to increase energy losses in the one element and thereby decrease the magnitude of the Q of the one element relative to the other element.

Another synchronization arrangement, illustrated diagrammatically in FIG. 4 as included in a structure of the type shown in FIGS. 1 and 2, involves employment of Q-switching. The cavity-providing structure of the element is maintained in a so-called low Q condition for a predetermined time after the start of pumping, as by occluding the light propagation path between the reflective cavity termini to prevent bidirectional light reflection therethrough, and is then rapidly switched to a high Q condition. Lasering action can develop in the cavity only after such switching occurs. One Q switching system suitable to provide synchronization in the present invention includes a Kerr cell structure with crossed polarizers as disclosed and claimed in the copending application of Snitzer et al. Serial No. 212,795, filed July 27, 1962, entitled "Laser Structure" and assigned to the same assignee as the preesnt application. In FIG. 4, the Q switching structure described in the copending application last mentioned is represented as a unit 52 included in the cavity-providing structure of the element 51 and interposed between the active laser component of the element and a partially reflective cavity terminus 53. With this structure, as explained in the Snitzer et al. copending application, lasering action can begin only when the Kerr cell is energized. Thus, for example, if the active laser components of the elements 10 and 51 in FIG. 4 are simultaneously pumped with identical input values of pumping energy, the laser light output of the element 51 can be delayed until a given time after initiation of the output light pulse from the element 10 by delaying energization of the Kerr cell of the structure 52 until such time. When the light output pulse from the element 51 is initiated, it passes through the centrally masked lens 42 to the element 10 to switch off the output light passing through the mask 45 in the manner previously described in connection with the structure of FIGS. 1 and 2.

A similar character of operation to that just described may be accomplished by removing the reflective surface 53 from the Kerr-cell structure and placing this surface on the exit end of the element 51. The Kerr cell then functions as a light modulator to control the intensity of the control light energy supplied to the element 10. It will be evident that the unit 52 operated either to effect Q-switching or the light modulation could be a structure using the Pockels effect, wherein light modulation is accomplished by use of an electric field to introduce a phase-shifted component giving rise to elliptical polarization, such structure including polarizing and analyzing elements and a phase-shift control element to accomplish the light modulation desired. The Q-switching or light modulation unit 52 could also be a structure using the Faraday effect wherein a magnetic field causes a rotation of polarization, by reason of which light modulation can also be accomplished using polarizing and analyzing elements operating in conjunction with the polarization rotating element.

In the structures described above, the control beam from the element 22 or 51 is separated from the axial output light pulse of the element 10 by means of the centrally masked lens 42 and centrally apertured mask 45 so that these two light emissions are angularly divergent as they emerge from the end face 12 of the element 10 and only the axial light output of the element 10 is projected beyond the mask 45. Thus the switching or termination of the normal output from the element 10 can be usefully detected despite the continuing passage of the control beam through and beyond the latter element after such switching occurs. However, while this angular beam separation is convenient and effective, other means for achieving beam separation can be used to attain the same results. Several of such alternative arrangements are illustrated diagrammatically in FIGS. 5–8 as included in a structure similar to that described in relation to FIGS. 1 and 2. Components in FIGS. 5–8 corresponding to similar components in FIGS. 1 and 2 are designated by similar reference numerals.

Thus, in the structure of FIG. 5, the lens 42 and mask 45 of FIGS. 1–4 are replaced by crossed polarizers 55, 56 respectively interposed between the elements 10, 22 and between the element 10 and a utilization device shown by way of example as a detector 58. In this structure, the light output of the element 22 passes through the polarizer 55 and into the element 10 parallel to the axis of the latter, as a plane-polarized control light beam. The effect of this control beam in effecting rapid depopulation of the high-energy-level atoms in essentially similar to that described in connection with FIGS. 1 and 2. The crossed polarizer 56 passes the light output of the element 10 as a beam polarized in a plane perpendicular to the plane of polarization of the output from the element 22, but blocks the direction and amplified polarized beam from the element 22 so as to prevent passage of the latter to the detector. Consequently, as soon as the output of the element 10 is switched off by the beam from the element 22, no light can pass to the detector even though the polarized beam from the latter element continues to pass through and beyond the element 10.

In the modified structure of FIG. 6, beam separation is accomplished by wavelength separation. The output of the element 22 passes directly into the element 10 parallel to the axis of the latter. However, the element 22 is adapted to emit light over a band of wavelengths which is included within, but much narrower than, the band of wavelengths of the light output of the element 10. This is exemplified graphically in FIG. 7, wherein, with power output plotted against wavelength, the output of the element 10 is represented by the curve C and the output of the element 22 by the curve D. Such output wavelength spread differences may be provided by making the active laser components of the elements 10 and 22 of different laser materials having appropriately differing emissive wavelength characteristics. For example, the core of the element 10 may be fabricated of neodymium-doped glass and the core of the element 22 may comprise a very narrow emissive bandwidth material such as neodymium in a crystal lattice such as calcium tungstate. With this arrangement, the narrow-band output of the element 22 will induce emission only of those atoms in the element 10 having an energy gap corresponding to wavelengths within such narrow band. However, by a cross-relaxation process other atoms in the element 10 with different energy gaps will transfer energy to the former atoms, and hence the beam from the element 22 will accomplish the desired reduction in inversion of the element 10 to switch off the output from the latter. Beam separation is achieved by interposing, between the element 10 and the detector 58, a filter 63 adapted to absorb light in the narrow band of wavelengths emitted by the element 22 but to pass light in wavelengths outside such narrow band emitted by the element 10. When the element 10 is switched off, therefore, no light can reach the detector 58 even though there is a continuing narrow-band output from the element 22 since this narrow-band energy is blocked by the filter 63.

FIG. 8 illustrates a system for separating the outputs of the elements 10 and 22 by time selection. In this system, the end face 12 of the element 10 is made non-reflective and a plane partially reflective mirror 65 is positioned in spaced relation to the end face 12 to provide a resonant cavity terminus. Intermediate the mirror 65 and the end face 12, and thus within the resonant cavity structure of the element 10, are disposed a pair of positive lenses 66, 67 in spaced relation to each other and coaxial with the element 10. These lenses are adapted to focus light, reflecting through the cavity, bidirectionally through a focal point intermediate the lenses. A disc-shaped opaque shutter 70, having a plurality of radial apertures or slits 71 regularly spaced around its periphery, as shown in FIG. 9, is disposed to intersect the aforementioned focal point and is mounted on a shaft 73 to rotate continuously in a plane perpendicular to the axis of the element 10. The shaft 73 is rotationally driven by suitable means (not shown) so that the slits 71 are successively carried into coincidence with the focal point. This provides a form of Q-switching structure which is disclosed and claimed in the copending application of Charles J. Koester, Serial No. 212,989, filed July 27, 1962, entitled Laser Structure and assigned to the same assignee as the present application. Each input pulse of pumping energy to the element 10 results in a succession of short-duration output light pulses represented in the upper graph of FIG. 10 by curves 75, 76, 77, 78 occurring respectively at times $t_1$, $t_2$, $t_3$, and $t_4$. Specifically, the shutter 70 is rotated at such speed that a plurality of the slits 71 successively coincide with the focal point between the lenses 66, 67 during the period when the element 10 is being pumped with energy. After the element 10 has initially reached the degree of inversion requisite for lasering action, the successive passage of the slits 71 across the focal point will produce a series of short-duration output light pulses, as explained in the last-mentioned copending application Serial No. 212,989. These pulses are received by the detector 58.

In the structure of FIG. 8, the control beam from the element 22 is directed into the element 10 parallel to the axis of the latter. The element 22 is adapted to emit this control beam as a short-duration light pulse (represented at 80 in FIG. 10) at a time $t_0$ after initiation of pumping of the element 10 but prior to the time $t_1$ at which the initial output pulse 75 from the element 10 would begin. For example, the element 22 may be energized to reach the requisite degree of inversion prior to that of the element 10, and may include a Kerr cell system such as the structure 52 of FIG. 4 which is rapidly energized and de-energized at the time $t_0$ to provide the desired short-duration output control light pulse. As indicated in the lower graph of FIG. 10, this pulse 80 from the element 22 reduces the degree of inversion in the element 10 so that, while the output pulse 80 of the element 22 reaches the detector as a pulse at time $t_0$ coincident with the passage of a slit 71 of the shutter 70 past the focal point of the lenses 66 and 67, no lasering action can occur in the element 10 to produce pulses at times $t_1$ and $t_2$. The continuation of pumping energy input to the element 10 may restore the inversion of energy states therein to produce outputs at times $t_3$ and $t_4$. Thus by observing the presence or absence of light pulses at the detector 58 at times $t_1$, $t_2$, the switching effect can be detected.

Referring now to FIG. 11, the alternative embodiment of the present invention there illustrated (in highly simplified diagrammatic form) is adapted for use as an optical logic element specifically providing a NOR gate. The structure of FIG. 11 includes three laser elements 150, 151, 152, each of elongate cylindrical configuration and having opposed, plane, parallel end faces. These three elements are shown as having axially central core portions respectively designated 154, 155 and 156 constituting active laser components all fabricated of the same laser material (such as neodymium-doped glass) surrounded by glass claddings respectively designated 157, 158 and 159. The three elements are identical with each other in all physical dimensions.

The element 150 has partially transmissive vacuum-evaporation deposited silver coatings 160, 161 on each of its opposed end faces to constitute conventional resonant cavity termini which are adapted to permit passage of some light into or out of the core 154 at both end faces. Similarly the elements 151 and 152 have silvered end coatings respectively indicated at 163, 164 and 165, 166, providing reflective resonant cavity termini for each of these elements. In the latter two elements, the end coatings 163, 165 are fully reflective and the coatings 164, 166 are partially transmissive so that the output light pulses from these two elements are emitted through the latter end coatings.

The three elements 150, 151, 152 are all provided with suitable pumping light sources, such as helical or other gaseous discharge flash tubes (not shown) of the character described above in connection with the structure of FIG. 1, with associated power supplies and triggering instrumentalities. Each of the active cores of these three elements is adapted, when pumped to the requisite degree of inversion, to emit a laser output light pulse concentrated in a narrow beam coaxial with the respective element and produced by pulsed lasering action as described above in connection with the functioning of the laser elements of FIG. 1. The three elements are mutually arranged so that the output pulses from both the elements 151, 152 are directed into the core 154 of the element 150 at a substantial angle to the axis of the latter element. For simplicity of illustration, the elements 151, 152 are shown as positioned with their long axes respectively oriented at an angle to the axis of the element 150 and with the partially transmissive surfaces 164, 166 directed toward the surface 160 of the element 150 in such manner that the axial output pulses emitted by the elements 151, 152 pass through the latter surface into the core 154. It will be appreciated, of course, that suitable intervening lens systems or other arrangements may in practice be employed to effect this result. The structure of FIG. 11 further includes a mask 168 positioned in spaced relation to the surface 161 of the element 150 and having an aperture 169 coaxial with the latter element to permit free passage of the axial output light pulse emitted by the core 154 through the surface 161. Thus such pulse can pass to a detection or utilization device beyond the mask 168. Light emitted through the surface 161 at any substantial angle to the axis of the element 150 is, however, occluded by the mask 168.

Thus pumping of the core 154 to the requisite degree of inversion will ordinarily produce an axial laser output light pulse from the element 150, of which the portion emitted through the end surface 161 will pass beyond the mask 168. Assume, however, that either or both of the elements 151 and 152 also emits a laser output light control pulse during the interval between attainment of the requisite inversion in the core 154 and the initiation of lasering action therein. This control pulse, directed into the core 154 at an angle to the axis of the element 150 and passing therethrough in a zig-zag path as reflectively directed by the clad walls of the core 154, will depopulate the upper energy level of the core 154 in the manner described in connection with FIG. 1 and will prevent the latter from emitting an axial output light pulse. In effect, a pulse from either of the elements 151 or 152 switches off the core 154 before lasering action has a chance to begin. The control pulse from the element 151 or 152 passing as an intense beam of laser emissive energy through the core 154 always at an angle to its axis, induces emissive transitions of upper level atoms in the core 154 in such manner as to produce light predominantly in off-axis modes to amplify the off-axis incident control beam. The portion of such light emerging through the surface 161 is accordingly not directed through the aperture 169 but is occluded by the mask 168. This inducing of emissive transitions rapidly depopulates the upper level population in the core 154 to reduce the degree of inversion below threshold before lasering action has a chance to start.

As will therefore be appreciated, the arrangement of elements of FIG. 11 provides an optical NOR gate: pumping of the core 154 will produce an output through the aperture 169 only if neither of the elements 151, 152 emits an output pulse during the immediately preceding interval. Means and arrangements for synchronizing the latter two elements and associated pumping sources with the pumping source of the element 150 so that output pulses from the elements 151, 152 are emitted during such interval, and means for controlling the firing or nonfiring of the elements 150, 151 responsive to given control conditions to provide a practicable logic element, will be readily apparent to those skilled in the art. It is to be understood, of course, that the structure of FIG. 11 is merely exemplary of the logic elements that may be provided by appropriate adaptation of the laser output-switching structures of the present invention.

The further embodiment of the invention illustrated in FIG. 12 is a laser structure wherein an output light pulse from a first laser body may be either switched on or off as desired by use of an output light pulse from a second laser body. In this structure, the first laser body is provided by a laser element 170 of substantial length, having for example the same configuration and dimensions as the laser element 22 of FIG. 1. The second laser body is provided by an element 172 which is here illustrated by way of example as being substantially shorter than the element 170, having for example the same configuration and dimensions as the element 10 in FIG. 1. Each of these elements 170, 172 includes an active laser component fabricated of a suitable laser material, the same laser material being used in both so that the two elements emit light of the same wavelength. Thus, by way of example, the active components of the elements 170, 172 may conveniently comprise coaxially positioned glass-clad cores of neodymium-doped glass, of the same character and construction as the element cores 14, 26 of FIG. 1.

In the structure shown, the longer element 170 has partially transmissive silvered surfaces 174, 175 at both end faces, and the shorter element 172 has a fully reflective silvered surface 177 on one end face and a partially transmissive silvered surface 178 on the other end face, to constitute reflective resonant cavity termini for the respective elements. Pumping light sources, such as helical gaseous discharge flash tubes 180 and 182 with associated power sources 183 and 184 and a common trigger circuit 186 powered from a suitable control instrumentality 188, are provided for the respective elements 170 and 172. These sources and instrumentalities have the same character and function as was more fully described in connection with the similar sources and instrumentalities of the structure of FIG. 1. Cylindrical reflectors 189 and 190, similar to the reflectors 39 and 40 of FIG. 1, are also provided to concentrate the pumping light from the flash tubes into the respective laser elements.

As shown, the laser elements 170 and 172 are aligned in spaced coaxial relation with the partially transmissive end surface 178 of the element 172 directed toward the element 170. Each of the elements 170 and 172 is adapted (when pumped to the requisite degree of inversion) to emit an output pulse of laser emissive energy which is predominantly axial plane wave light concentrated in a narrow beam coaxial with the elements. Thus the output pulse of light from the element 172, emitted through the partially transmissive surface 178, passes into the element 170 through the partially transmissive surface 174 and in a direction parallel to the axis of the element 170. Such light advances through the core of the element 170 in the same modes (the axial plane wave modes) in which it is desired to induce emission in the latter core. It will be appreciated, of course, that alternative arrangements for so directing the output pulse from the element 172 through the element 170 in an axial path or any other low-loss mode may be employed if desired.

In operation, with sufficient charge energy stored in the power sources 183, 184, the control instrumentality 188 is actuated (as by closing a manually operated switch 192) to send an electrical pulse through the common trigger circuit 186 and thereby to initiate simultaneous pulses of pumping light from the flash tubes 180 and 182. These pumping light pulses are effective to establish the requisite degree of inversion for lasering action in the cores of the respective elements 170 and 172. When it is desired that the element 172 initiate lasering action in the element 170, lasering action is caused to begin first in the element 172 as by adjustment of the relative values of energy inputs from the power sources 183 and 184 into the respective flash tubes (as explained above in connection with FIG. 1). Specifically, the electrical energy input into each flash tube 180, 182 is conveniently selected such that the output pulse from the element 172 begins during thhe interval between the attainment of the requisite inversion in the element 170 and the time at which lasering action would ordinarily start in the latter element. Alternative methods of synchronization may, of course, be employed such as those previously discussed in connection with the structure of FIG. 1.

The output pulse from the element 172 thus passes into and through the core of the element 170 as an intense, axially directed beam of predominantly axial plane wave laser emissive energy. As it advances through the latter core, it induces emissive transition of upper level atoms therein in such manner as to produce light predominantly in the axial plane wave modes (because of its axial incident orientation). This induced emission very rapidly switches on the lasering action in the core of the element 170, producing an axial output light pulse which is initiated at a time (relative to the attainment of the requisite inversion in the core) earlier than it would otherwise begin. A further and particularly advantageous result of such induced emission is to provide a desirably larger initial instantaneous power output from the element 170 than would otherwise be achieved. Such output pulse from thhe element 170 is emitted through both partially transmissive end surfaces of the element, a portion convenient for use as desired being directed through the surface 175.

When in using the FIG. 12 structure it is desired that the element 172 prematurely terminate lasering action in the element 170, lasering action in the element 172 is caused to start a preselected interval after initiation of lasering action in the element 170. This is accomplished in any of the several manners explained above. Since the substantial length of the element 170 enables substantial amplification of the light energy from the element 172 during propagation of this energy bi-directionally along the length of the element 170, the desired rapid depopulation of the element 170 may now be accomplished by smaller values of control light input to the element 170 from the element 172. If the element 170 is sufficiently long that the reflective surface 175 is no longer needed and can therefore be omitted, the magnitude of depopulation becomes increasingly larger from the left-hand end to the right-hand end (as shown in FIG. 12) of the element 170 according to the corresponding spacially increasing values of amplified control light intensity.

The foregoing structures have been described as including laser elements of the so-called "pulsed" type, energized by discontinuous pulses of pumping light and emitting corresponding discontinuous output light pulses. However, the structures of the present invention are equally adapted for use in continuous or semi-continuous laser operation, wherein a body of solid or other laser material is maintained continuously (or semi-continuously) at or above the threshold degree of inversion by a continuous pumping energy input to provide a continuous or semi-continuous laser light output beam. For example, in the structure of FIG. 1, if the element 10 and associated pumping light sources are arranged and adapted to constitute a continuous laser, the control beam from the element 22 (initiated at a desired moment) will temporarily reduce the level of inversion in the element 10 below threshold so as to interrupt the normal output of the element 10 at such moment. Other modifications and applications of the above-described structures for continuous laser operation will also be apparent to those skilled in the art.

In addition, while the foregoing structures have been described and illustrated as incorporating laser elements consisting of cylindrical cores with cladding, elements of other construction may be used if desired. Examples are unclad laser rods, and laser fibers of both the clad and unclad type.

Since closely spaced fibers embedded in a common cladding have been found to exhibit "cross-talk" or electromagnetic coupling of energy from one fiber to another, it is evident that the controlled active laser fiber component may be embedded in closely spaced parallel arrangement with a glass fiber in a common cladding and that the control light energy may then be focused upon one end of the glass fiber from which it will be coupled by crosstalk into the laser fiber to provide the desired control over the lasering action of the latter. The magnitude of the cross-talk coupling varies approximately inversely as the fiber spacing. A spacing comparable to a laser-emissive wavelength or somewhat less will accordingly provide adequate coupling, for moderate fiber lengths, to accomplish effective control action.

In the preceding description of the invention, it has been explained that there are several ways for accomplishing the relative times desired between initiation of lasering action in the control laser and that in the controlled laser. Thus a desired difference in relative timing may be accomplished by selection or control of the relative values of power supplied to the individual flash tube light sources associated with the control and controlled lasers, thereby to select or control the relative values of pumping light energies supplied to these elements. The relative controlled timing of flash initiation in the flash tubes has also been mentioned.

Aonther manner in which this matter of relative laser action timing may be accomplished is by selection of different threshold levels for the control and controlled lasers at the time of their fabrication. Thus increasing percentages, up to a point, of rare earth laser materials used as dopants decrease the threshold level for a given value of pumping light energy supplied to the laser element and for a given value of Q of the resonant structure in which it is operated. Differing values of threshold level as between the control and controlled lasers affects, of course, the time delay between the initiation of their pumping light energizations and the initiations of their lasering actions. Threshold level may also be selected and controlled by selection of the host material so that, for example, the control laser element may use a flint glass host material and the controlled laser element may use a crown glass host material or one of these elements may use a glass host material and the other a crystalline host material. It was also explained above that the matter of relative timing of initiation of laser action may be selected or controlled by selection or control of the Q of the resonant cavity in which the laser element is used. This in effect may be considered a further manner of selecting or controlling the threshold level of the element. For example, the Q of an operative lasering structure is affected by the length of laser element, longer lengths of the element providing higher values of Q since the element has increased capacity for storage of light energy by reason of the greater length of optical path. Also the longer laser element provides a longer light propagation path between the reflective surface termini of a resonant cavity structure so that there are fewer reflections of a quantum of light energy by each reflective end surface per unit of time, thus increasing the value of Q of the structure which is predominantly affected by the reflection loss factor of the termini reflecting surfaces. By reason of this effect of the reflective end surface losses on the value of Q, it will be evident that by selecting or controlling the effective end surface values of reflectance desired relative values of Q may be attained for the control and controlling laser structures. One form of effective reflectance control is comprised by the Q switching arrangements described above.

While it is generally considered that radiative transition takes place in a laser element between two energy levels, one or both of these energy levels may actually be comprised by two or more very closely spaced levels. Usually one of the closely spaced levels exerts predominating control over the emission wavelength for any given set of operating conditions. However another of the closely spaced levels may be made the predominating one upon change of one or more operating conditions, such as by change of the spectro-reflectance characteristics of the reflective termini of the resonant structure. In these instances, the prevailing emissive wavelength is dependant upon the prevailing dominant energy level involved in the lasering action. Where such closely spaced energy levels are available, depopulation of the prevailing dominant energy level may be accomplished by supplying to the laser element control light energy having a wavelength corresponding to the emissive wavelength which is characteristic of another of the closely spaced energy levels not then dominant. In general, then, there is in certain laser materials an additional level to which excited ions can make transition. It is then possible to quench or switch off laser action by sending into this material intense light (or light made intense by reason of laser amplification) of a wavelength which will cause this transition to occur, thereby removing ions from the upper energy level normally involved in the laser action. Reference in the appended claims to control wave energy of wavelength substantially the same as the laser emissive wavelength is accordingly intended to include energy wavelengths effecting ion quenching or stimulating transitions whether the latter wavelengths be the same as or different from the laser emissive wavelength.

It is to be understood that the invention is not limited to the features and embodiments hereinabove specifically set forth, but may be carried out in other ways without departure from its spirit.

What is claimed is:

1. A time-controlled-output laser structure comprising an active laser material, means for providing repetitive reflections of laser emissive light through said material, a source of energy coupled to said material and having an energy intensity sufficient for pumping said material to establish an operational condition of inverted population in excess of the threshold level for oscillatory lasering action, said laser material under said operational condition exhibiting a characteristic normal build-up interval to attain said lasering action at a high level of stimulated-emission energy output after establishment of said threshold inversion and thereafter normally maintaining said emissive energy output at substantially said high level for a further interval, and a source of control light directed into said laser material with an intensity and at a time after attainment of said threshold level to be effective to decrease one of said intervals and thereby control a time characteristic of the interval during which said laser material possesses said lasering action with said high-level stimulated-emission energy output.

2. A time-controlled-output laser structure comprising an active laser material having a predominant characteristic wavelength of laser emissive light, means for providing repetitive reflections of laser emissive light through said material, a source of energy coupled to said material and having an energy intensity sufficient for pumping said material to establish an operational condition of inverted population in excess of the threshold level for oscillatory lasering action, said laser material under said operational condition exhibiting a characteristic normal build-up interval to attain said lasering action at a high level of stimulated-emission energy output after establishment of said threshold inversion and thereafter normally maintaining said emissive energy output at substantially said high level for a further interval, and laser means providing a source of control light energy of said characteristic wavelength directed into said laser material with an intensity and at a time after attainment of said threshold level to be effective to decrease one of said intervals and thereby control a time characteristic of the interval during which said laser material possesses said lasering action with said high-level stimulated-emission energy output.

3. A time-controlled-output laser structure comprising an active laser material, means for providing repetitive reflections of laser emissive light through said material, a source of energy coupled to said material and having an energy intensity sufficient for pumping said material to establish an operational condition of inverted population in excess of the threshold level for oscillatory lasering action, said laser material under said operational condition exhibiting a characteristic normal build-up interval to attain said lasering action at a high level of stimulated-emission energy output after establishment of said threshold inversion and thereafter normally maintaining said emissive energy output at substantially said high level for a further interval, a source of control light directed into said laser material with an intensity effective to decrease one of said intervals, and means for controlling the time of injection of said control light into said laser material in relation to the establishment therein of said threshold inversion thereof, thereby to control a time characteristic of the interval during which said laser material possesses said lasering action with said high-level stimulated-emission energy output.

4. A time-controlled-output laser structure comprising a pair of elongated lasers formed of a common active laser material and one of said lasers being positioned to direct laser-emissive light longitudinally through the other thereof, means associated with each of said lasers for providing repetitive reflections of laser emissive light therethrough, sources of energy coupled to said lasers for concurrent energizations thereof with energy intensities sufficient for pumping said materials thereof to establish in each an operational condition of inverted population in excess of the threshold level for oscillatory lasering action, each said laser under said operational condition thereof exhibiting a characteristic normal build-up interval to attain said lasering action at a high level of stimulated-emission energy output after establishment of said threshold inversion and thereafter normally maintaining said emissive energy output at substantially said high level for a further interval, the relative intensities of said energy sources and the relative volumes of said material in said lasers being selected to provide for said one laser attainment of said inversion threshold thereof at a time different from that of said other laser and an emissive energy intensity effective to decrease one of said intervals of said other laser and thereby control a time characteristic of the interval during which said other laser possesses said high-level stimulated-emission energy output.

5. A time-controlled-output laser structure comprising a pair of elongated lasers formed of different volumes of a common active laser material and one of said lasers being positioned to direct laser-emissive light longitudinally through the other thereof, means associated with each of said lasers for providing repetitive reflections of its laser emissive light therethrough, and at least one source of photonic energy coupled to said lasers for concurrent energizations thereof with photonic energy intensities sufficient for pumping said materials thereof to establish in each an operational condition of inverted population in excess of the threshold level for oscillatory lasering action, each said laser under said operational condition thereof exhibiting a characteristic normal build-up interval to attain said lasering action at a high level of stimulated-emission energy output after establishment of said threshold inversion and thereafter normally maintaining said emissive energy output at substantially said high level for a further interval, the relative volumes of said material in said lasers being selected in relation to the relative energy intensity energizations thereof to provide for said one laser attainment of said inversion threshold thereof at a time different from that of said other laser and an emissive energy intensity effective to decrease one of said intervals of said other laser and thereby control a time characteristic of the interval during which said other laser possesses said high-level stimulated-emission energy output.

6. A time-controlled-output laser structure comprising a pair of elongated lasers formed of different volumes of a common active laser material and the one of said lasers of larger volume being positioned to direct laser-emissive light longitudinally through the other thereof, means associated with each of said lasers for providing repetitive reflections of laser emissive light therethrough, and at least one source of energy coupled to said lasers for concurrent energizations thereof with energy intensities sufficient for pumping said materials thereof to establish in each an operational condition of inverted population in excess of the threshold level for oscillatory lasering action, each said laser under said operational condition thereof exhibiting a characteristic normal build-up interval to attain said lasering action at a high level of stimulated-emission energy output after establishment of said threshold inversion and thereafter normally maintaining said emissive energy output at substantially said high level for a further interval, the relative volumes of said material in said lasers being selected in relation to the relative energy intensity energizations thereof to provide for said one laser attainment of said inversion threshold thereof at a time later than that of said other laser and an emissive energy intensity effective to decrease below said threshold inversion the terminal portion of said normal high-level emissive energy output interval of said other laser and thereby control the time interval during which said other laser possesses said high-level stimulated-emission energy output.

7. A time-controlled-output laser structure comprising a pair of elongated lasers formed of different volumes of a common active laser material and the one of said lasers of smaller volume being positioned to direct laser-emissive light longitudinally through the other thereof, means associated with each of said lasers for providing repetitive reflections of laser emissive light therethrough, and at least one source of energy coupled to said lasers for concurrent energizations thereof with energy intensities sufficient for pumping said materials thereof to establish in each an operational condition of inverted population in excess of the threshold level for oscillatory lasering action, each said laser under said operational condition thereof exhibiting a characteristic normal build-up interval to attain said lasering action at a high level of stimulated-emission energy output after establishment of said threshold inversion and thereafter normally maintaining said emissive energy output at substantially said high level for a further interval, the relative volumes of said material in said lasers being selected in relation to the relative energy intensity energizations thereof to provide for said one laser attainment of said inversion threshold thereof at a time earlier than that of said other laser and an emissive energy intensity effective during the stimulated emissive output interval of said one laser to maintain said other laser below the threshold inversion thereof and thereby reduce the interval during which said other laser posesses said high-level stimulated-emission energy output.

8. A time-controlled-output laser structure comprising an active laser material, means for providing repetitive reflections of laser emissive light through said material, a source of energy coupled to said material and having an energy intensity sufficient for pumping said material to establish an operational condition of inverted population in excess of the threshold level for oscillatory lasering action, said laser material under said operational condition exhibiting a characteristic normal build-up interval to attain said lasering action at a high level of stimulated-emission energy output after establishment of said threshold inversion and thereafter normally maintaining said emissive energy output at substantially said high level for a further interval, and means including a source of control light for directing control light energy into said laser material at the outset of said build-up interval thereof and with an intensity effective to accelerate said laser material into said high-level stimulated-emission energy output and thereby decrease said normal build-up interval thereof.

9. A time-controlled-output laser structure comprising an active laser material, means for providing repetitive reflections of laser emissive light through said material, a source of energy coupled to said material and having an energy intensity sufficient for pumping said material to establish an operational condition of inverted population in excess of the threshold level for oscillatory lasering action, said laser material under said operational condition exhibiting a characteristic normal build-up interval to attain said lasering action at a high level of stimulated-emission energy output after establishment of said threshold inversion and thereafter normally maintaining said emissive energy output at substantially said high level for a further interval, a source of control light directed into said laser material with an intensity and at a time after attainment of said threshold level to be effective to decrease one of said intervals and thereby control a time characteristic of the interval during which said laser material possesses said lasering action with said high-level stimulated-emission energy output, and means for selecting the stimulated-emission light energy output of said laser material to the exclusion of light from said control source.

10. A time-controlled-output laser structure comprising an elongated laser having a longitudinal axis and formed of an active laser material, means for providing repetitive reflections of laser emissive light longitudinally through said laser, a source of energy coupled to said laser and having an energy intensity sufficient for pumping said material thereof to establish an operational condition of inverted population in excess of the threshold level for oscillatory lasering action, said laser under said operational condition exhibiting a characteristic normal build-up interval to attain said lasering action at a high level of stimulated-emission energy output after establishment of said threshold inversion and thereafter normally maintaining said emissive energy output at substantially said high level for a further interval, a source of control light directed longitudinally into said laser at an angle to the axis thereof and with an intensity and at a time after attainment of said threshold level to be effective to decrease one of said intervals and thereby control a time characteristic of the interval during which said laser possesses said high-level stimulated-emission energy output, and means for angularly selecting the longitudinally directed stimulated-emission light energy output of said laser to the exclusion of light from said control source.

11. A time-controlled-output laser structure comprising an elongated laser having a longitudinal axis and formed of an active laser material, means for providing repetitive of reflections of laser emissive light longitudinally through said laser, a source of energy coupled to said laser and having an energy intensity sufficient for pumping said material thereof to establish an operational condition of inverted population in excess of the threshold level for oscillatory lasering action, said laser under said operational condition exhibiting a characteristic normal build-up interval to attain said lasering action at a high level of stimulated-emission energy output after establishment of said threshold inversion and thereafter normally maintaining said emissive energy output at substantially said high level for a further interval, a source of control light directed longitudinally into said laser at an angle to the axis thereof and with an intensity and at a time after attainment of said threshold level to be effective to decrease one of said intervals and thereby control a time characteristic of the interval during which said laser possesses said high-level stimualted-emission energy output, and a mask element having a laser light transparent area positioned coaxial with said laser and an opaque area surrounding said transparent area for selecting the stimulated-emission light energy output of said laser to the exclusion of light from said control source.

12. A time-controlled-output laser structure comprising an elongated laser having a longitudinal axis and formed of an active laser material, means for providing repetitive reflections of laser emissive light longitudinally through said laser, a source of energy coupled to said laser and having an energy intensity sufficient for pumping said material thereof to establish an operational condition of inverted population in excess of the threshold level for oscillatory lasering action, said laser under said operational condition exhibiting a characteristic normal build-up interval to attain said lasering action at a high level of stimulated-emission energy output after establishment of said threshold inversion and thereafter normally maintaining said emissive energy output at substantially said high level for a further interval, and means including a source of control light and lens means for directing a hollow cone of control light longitudinally into said laser with an intensity and at a time after attainment of said threshold level to be effective to decrease one of said intervals and thereby control a time characteristic of the interval during which said laser possesses said high-level stimulated-emission energy output.

13. A time-controlled-output laser structure comprising an elongated laser having a longitudinal axis and formed of an active laser material, means for providing repetitive reflections of laser emissive light longitudinally through said laser, a source of energy coupled to said laser and having an energy intensity sufficient for pumping said material thereof to establish an operational condition of inverted population in excess of the threshold level for oscillatory lasering action, said laser under said operational condition exhibiting a characteristic normal build-up interval to attain said lasering action at a high level of stimulated-emission energy output after establishment of said threshold inversion and thereafter normally maintaining said emissive energy output at substantially said high level for a further interval, means including a source of control light and lens means for directing a hollow cone of light axially into said laser with an intensity and at a time after attainment of said threshold level to be effective to decrease one of said intervals and thereby control a time characteristic of the interval during which said laser possesses said high-level stimulated-emission energy output, and axially-positioned masking means for selecting the stimulated-emission light energy output of said laser to the exclusion of light from said control source.

14. A time-controlled-output laser structure comprising a pair of elongated lasers formed of a common active laser material and one of said lasers being positioned to direct laser-emissive light longitudinally through the other thereof, means associated with each of said lasers for providing repetitive reflections of laser emissive light therethrough, sources of energy coupled to said lasers for concurrent energizations thereof with energy intensities sufficient for pumping said materials thereof to establish in each an operational condition of inverted population in excess of the threshold level for oscillatory lasering action, each said laser under said operational condition thereof exhibiting a characteristic normal build-up interval to attain said lasering action at a high level of stimulated-emission energy output after establishment of said threshold inversion and thereafter normally maintaining said emissive energy output at substantially said high level for a further interval, the relative intensities of said energy sources and the relative volumes of said material in said lasers being selected to provide for said one laser attainment of said inversion threshold thereof at a time different from that of said other laser and an emissive energy intensity effective to decrease one of said intervals of said other laser and thereby control a time characteristic of the interval during which said other laser possesses said high level stimulated-emission energy output, and means for selecting the stimulated-emission light energy output of said other laser to the exclusion of light emitted by said one laser.

15. A time-controlled-output laser structure comprising an active laser material, means for providing repetitive reflections of laser emissive light through said material, a source of energy coupled to said material and having an energy intensity sufficient for pumping said material to establish an operational condition of inverted population in excess of the threshold level for oscillatory lasering action, said laser material under said operational condition exhibiting a characteristic normal build-up interval to attain said lasering action at a high level of stimulated-emission energy output after establishment of said threshold inversion and thereafter normally maintaining said emissive energy output at substantially said high level for a further interval, and means including a source of control light and a controllable light modulator therefor for directing into said laser material control light having an intensity at a modulator-controlled time after attainment of said threshold level effective to decrease one of said intervals and thereby under control of said light modulator modify a time characteristic of the interval during which said laser possesses said high-level stimulated-emission energy output.

16. A time-controlled-output laser structure comprising a pair of elongated lasers formed of a common active laser material and one of said lasers being positioned to direct laser-emissive light longitudinally through the other thereof, means associated with each of said lasers to establish therefor a resonant cavity structure enabling repetitive reflections of laser emissive light therein, sources of energy coupled to said lasers for concurrent energizations thereof with energy intensities sufficient for pumping said materials thereof to establish in each an operational condition of inverted population in excess of the threshold level for oscillatory lasering action, each said laser under said operational condition thereof exhibiting a characteristic normal build-up interval to attain said lasering action at a high level of stimulated-emission energy output after establishment of said threshold inversion and thereafter normally maintaining said emissive energy output at substantially said high level for a further interval, the relative intetnsities of said energy sources and the relative volumes of said material in said lasers being selected to provide for said one laser a value of emissive energy output intensity effective to decrease below threshold the inversion of said other laser, means for controlling between high and low values the resonant Q of one of said cavity structures to control the interval of high-level emissive energy output of said other laser, and means for selecting the stimulated-emission light energy output of said other laser to the exclusion of light emitted by said one laser.

17. A time-controlled-output laser structure comprising a pair of elongated lasers formed of a common active laser material and one of said lasers being positioned to direct laser-emissive light longitudinally through the other thereof, means associated with each of said lasers to establish therefor a resonant cavity structure enabling repetitive reflections of laser emissive light energy therein, sources of energy coupled to said lasers for concurrent energizations thereof with energy intensities sufficient for pumping said materials thereof to establish in each an operational condition of inverted population in excess of the threshold level for oscillatory lasering action, and each said laser under said operational condition thereof exhibiting a characteristic normal build-up interval to attain said lasering action at a high level of stimulated-emission energy output after establishment of said threshold inversion and thereafter normally maintaining said emission energy output at substantially said high level for a further interval, the relative intensities of said energy sources and the relative volumes of said material in said lasers being selected to provide for said one laser a value of emissive energy output intensity effective to decrease below threshold the inversion of said other laser, means for controlling between high and low values the resonant Q of the cavity structure associated with said one laser to control the interval of high-level emissive energy output of said other laser, and means for selecting the stimulated-emission light energy output of said other laser to the exclusion of light emitted by said one laser.

18. A time-controlled-output laser structure comprising a pair of elongated lasers formed of a common active laser material and one of said lasers being positioned to direct laser-emissive light longitudinally through the other thereof, means associated with each of said lasers to establish therefor a resonant cavity structure enabling repetitive reflections of laser emissive light energy therein, sources of energy coupled to said lasers for concurrent energizations thereof with energy intensities sufficient for pumping said materials thereof to establish in each an operational condition of inverted population in excess of the threshold level for oscillatory lasering action, each said laser under said operational condition thereof exhibiting a characteristic normal build-up interval to attain said lasering action at a high level of stimulated-emission energy output after establishment of said threshold inversion and thereafter normally maintaining said emissive energy output at substantially said high level for a further interval, the relative intensities of said energy sources and the relative volumes of said material in said lasers being selected to provide for said one laser a value of emissive energy output intensity effective to decrease below threshold the inversion of said other laser, means for controlling between high and low values the resonant Q of the cavity structure associated with said other laser to control the interval of high-level emissive energy output of said other laser as further controlled by the emissive energy output of said one laser, and means for selecting the stimulated-emission light energy output of said other laser to the exclusion of light emitted by said one laser.

19. A time-controlled-output laser structure comprising a pair of elongated lasers formed of a common active laser material and one of said lasers being positioned to direct laser-emitted light longitudinally through the other thereof, means associated with each of said lasers to establish therefor a resonant cavity structure enabling repetitive reflections of laser emissive light energy therein, sources of energy coupled to said lasers for concurrent energizations thereof with energy intensities sufficient for pumping said materials thereof to establish in each an operational condition of inverted population in excess of the threshold level for oscillatory lasering action, said one and said other laser under said operational conditions thereof attaining respective shorter and longer intervals of said lasering action at a high level of stimulated-emission energy output after establishment of said threshold inversions thereof, the relative intensities of said energy sources and the relative volumes of said material in said lasers being selected to provide for said one laser a value of emissive energy output intensity effective to decrease below threshold the inversion of said other laser, means for periodically controlling between high and low values the resonant Q of the cavity structure associated with said other laser to develop thereby pulses of high-level emissive energy output in the absence of emission-suppressive control of the emissive energy output of said one laser, and means for selecting the stimulated-emission light energy output of said other laser to the exclusion of light emitted by said one laser.

20. A time-controlled-output laser structure comprising an active laser material, means for providing repetitive reflections of laser emissive light through said material, a source of energy coupled to said material and having an energy intensity sufficient for pumping said material to establish an operational condition of inverted population in excess of the threshold level for oscillatory lasering action, said laser material under said operational condition exhibiting a characteristic normal build-up interval to attain said lasering action at a high level of stimulated-emission light energy output over a first band of wavelengths and thereafter normally maintaining said emissive energy output at substantially said high level for a further interval, a source of control light having a band of light wavelengths included within but narrower than said first wavelength band and directed into said laser material with an intensity and at a time after attainment of said threshold level to be effective to decrease one of said intervals and thereby control a time characteristic of the interval during which said laser material possesses said high-level stimulated-emission energy output, and filter means positioned to receive the stimulated-emission energy output of said laser material and to filter therefrom light energy within said narrower band of wavelengths and to translate light energy within the remainder of said first wavelength band.

References Cited by the Examiner

UNITED STATES PATENTS

| | | | |
|---|---|---|---|
| 2,929,922 | 3/1960 | Schawlow et al. | 331–94.5 |
| 3,098,112 | 7/1963 | Horton | 88—61 |
| 3,130,254 | 4/1964 | Sorokin et al. | |
| 3,172,056 | 3/1965 | Stitch | 331—94.5 |

OTHER REFERENCES

Devlin et al.: "Composite Rod Optical Masers" Applied Optics, volume 1, No. 1, January 1962, pages 11–15.

"Pulsed Lasers In Tandem," Electronic News, volume 7, No. 319, May 21, 1962, page 43.

JEWELL H. PEDERSEN, *Primary Examiner.*

FREDERICK M. STRADER, *Examiner.*